March 23, 1954  S. McEVER  2,672,996

BOX DUMPING MACHINE

Filed March 13, 1951  2 Sheets-Sheet 1

INVENTOR.
SAM MCEVER

BY Edw. T. Newton

ATTORNEY

March 23, 1954
S. McEVER
2,672,996
BOX DUMPING MACHINE
Filed March 13, 1951
2 Sheets-Sheet 2
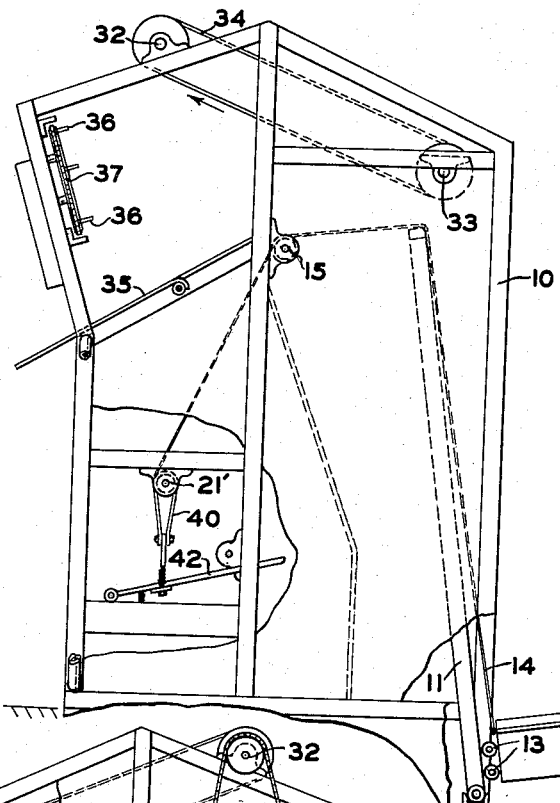
FIG. 3
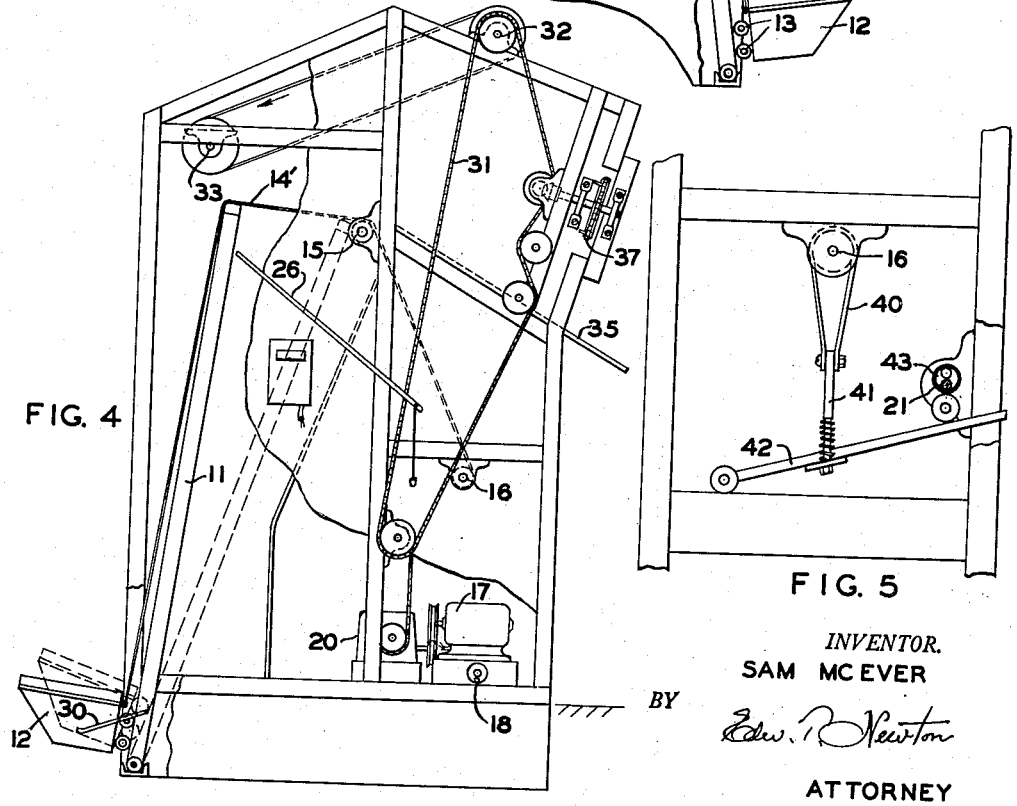
FIG. 4
FIG. 5
INVENTOR.
SAM MCEVER
BY Edw. B. Newton
ATTORNEY Patented Mar. 23, 1954

2,672,996

UNITED STATES PATENT OFFICE 2,672,996

BOX DUMPING MACHINE

Sam McEver, Brookhaven, Ga.

Application March 13, 1951, Serial No. 215,243

11 Claims. (Cl. 214—306)

This invention relates to a box dumping machine, and more particularly to a machine capable of dumping a stack of boxes such as are widely used in the citrus fruit industry.

In the use of machines for handling fruit, and other products, such as machines for sorting and sizing the product being handled, the product has customarily been poured by hand from field boxes onto the handling machinery. This process was slow and laborious, as well as expensive from the standpoint of man hours consumed, particularly since the boxes had to be dumped one at a time in order to prevent congestion and jamming of the product in the machinery.

It is therefore an object of my invention to provide a box dumping machine which will automatically lift a box, or a stack of boxes, to a desired height, dump them one at a time, and to automatically remove the empty box and turn it to an upright position again.

Another object of my invention is to provide a box dumping machine in which lift mechanism for a plurality of boxes stacked one upon the other is set in motion manually, and thereafter the machine operates automatically to tilt the boxes to dump the contents therefrom, and then to remove the empty boxes and return them to upright position.

Another object of my invention is to provide a box dumping machine with lift mechanism for a plurality of boxes stacked one upon the other for lifting said boxes to a suitable height for dumping, and brake mechanism for automatically controlling the descent of said lift mechanism.

Another object of my invention is to provide a box dumping machine which is simple in design, rugged in construction, economical to manufacture, and efficient in operation.

Other and further objects and advantages will be apparent from the following description, taken in connection with the accompanying drawings in which like characters of reference designate corresponding parts throughout the several views, and wherein:

Fig. 3 is a left side view of the machine shown in Fig. 1.

Fig. 4 is a right side view of the machine shown in Fig. 1.

Fig. 5 is an enlarged fragmentary view showing a detail of the machine.

Figure 1:
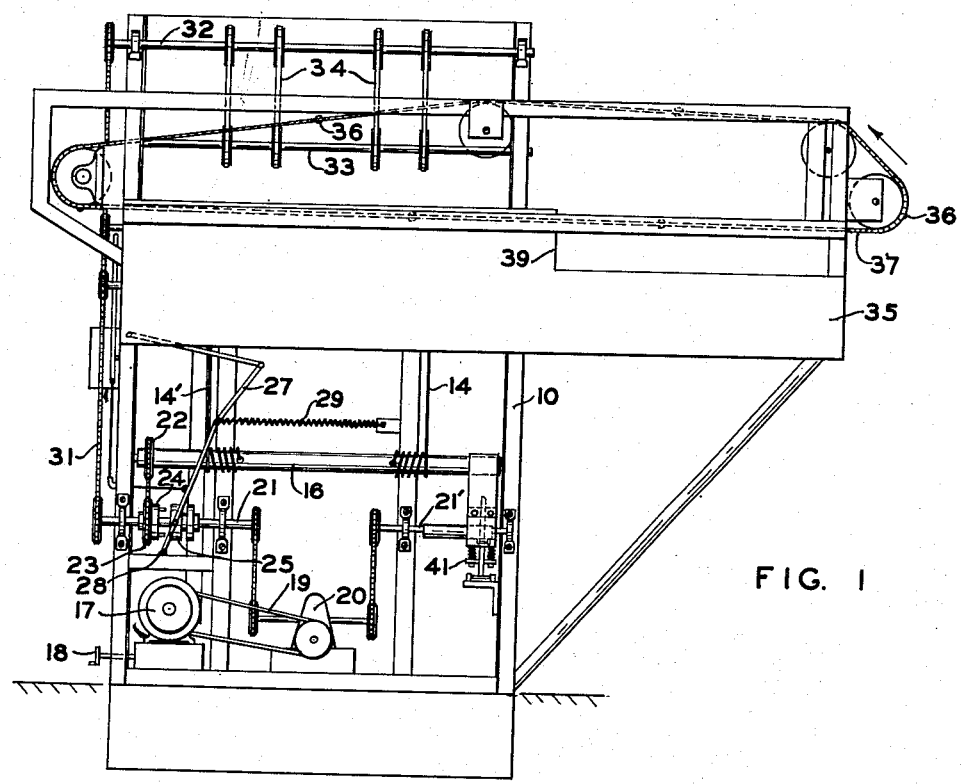
Fig. 1 is a rear elevation of a machine embodying my invention.
Figure 2:
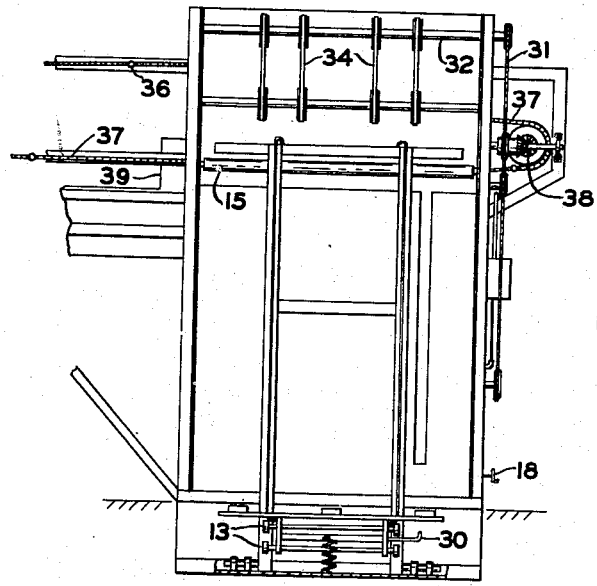
Fig. 2 is a front elevation of the main operating parts of the machine shown in Fig. 1.

In the embodiment chosen for purposes of illustration, an upright framework 10 is provided for the mounting of the various parts of the machine. Pivotally mounted on the framework 10 at the front thereof is a cradle 11 upon which the lift platform 12 rides, suitable rollers 13 being attached to the platform for this purpose. Cables 14, 14', attached to opposite sides of the platform 12 pass upwardly over the end of cradle 11, thence over guide roller 15 and downwardly to the lift shaft 16 to which they are attached in such manner as to be wound about said shaft to raise said platform when the lift shaft 16 is rotated in one direction, and to be unwound from said shaft to permit the lift platform 12 to return by gravity to the bottom of cradle 11 when the driving force is removed from lift shaft 16.

Driving motor 17 which is suitably mounted at the base of the framework 10 is provided with a handle 18 for adjusting the speed thereof, according to ordinary and well-known constructions, and is operatively connected by belt 19 to speed reduction mechanism 20, also of ordinary and well-known construction.

Through the speed reduction mechanism 20 the motor 17 drives shafts 21, 21' which are rotatably journaled on the framework 10, as best shown in Fig. 1. Lift shaft 16 is arranged to be driven from the shaft 21 by the chain passing over the sprocket 22 which is fastened to shaft 16 and sprocket 23 which is rotatably mounted on the shaft 21 and has attached thereto the clutch finger plate 24 which is arranged for selective engagement with the clutch 25 which is arranged to rotate with shaft 21 and to slide thereon by operation of the lever 26 and its associated linkage mechanism 27 which is connected thereto and pivotally mounted on the framework at 28. The lever 26 is arranged to be pulled down by hand against the operation of spring 29, and to be returned to raised position by means of trip 30 on the platform 12 as will be more fully explained hereinafter.

Driving motor 17 is also connected through shaft 21 and sprocket chain 31 so as to drive the cross frame shaft 32, which is journaled near the top of the framework 10 and toward the back thereof, as seen in Fig. 4. Mounted parallel to the shaft 32, and in the upper part of the framework 10 toward the front thereof, as seen in Fig. 4, is another cross frame shaft 33. A plurality of dumping belts 34 pass around pulleys mounted on the shafts 32 and 33, and these belts are arranged to pass at a desired height above the upper end of the cradle 11 so as to resiliently engage the uppermost box being raised by the platform 12 and to tilt it over onto the inclined platform 35 so as to spill the contents of the box downwardly over the platform 35 and onto other suitable handling machinery (not shown). When a box has thus been tilted to rest on its side on the inclined platform 35, it is then in position to be engaged by fingers 36 on the take-off chain 37 which is also driven by the motor 17, chain 31 and meshing bevel gears 38. The box which has been tilted by the dumping belts 34 so as to have the contents thereof spilled down the inclined platform 35 and is left upon its side on the platform 35 is engaged by an oncoming finger 36 on the take-off chain 37 and slid cross-wise of the frame in a direction to pass along the inclined platform 35 to the right in Fig. 1. It will be noted that the inclined platform 35 is a narrowing platform as indicated at 39 and is proportioned so that when the empty box being slid along on its side reaches the narrow portion of the platform 35 it will tilt backwardly by the over balancing weight of its bottom portion and thus roll off of the platform 35 so as to right itself. Suitable support means may be provided for catching the boxes as they roll off of the narrow portion of the platform 35, or they may be received in upright position upon a traveling belt for conveying them to another place for use as will be well understood.

Because of the speed reducing mechanism 20 the upward motion of the lift platform 12 is slow; however, unless some braking mechanism were provided, the downward travel of the platform 12 would be too rapid, hence I provide a novel braking mechanism which comprises a strap 40 of flexible material which is looped about the lift shaft 16 and has its ends connected to a spring tension member 41 which is connected to a pivoted lever arm 42 which operates against roller cam mechanism 43 on shaft 21 so that as the shaft 21 rotates the pivoted lever arm 42 will be forced downwardly to tighten the brake strap 40 about the lift shaft 16 so as to prevent the lift shaft 16 from gaining too great speed upon the downward travel of the platform 12.

In the operation of my box dumping machine, the driving motor 17 is connected to a source of power, and boxes filled with products or commodities to be dumped are brought up to my machine and placed upon the lift platform 12. Boxes may be placed upon the lift platform one at a time; or, as they are customarily handled by two wheeled dollies, a plurality of boxes stacked one upon another may be wheeled up to my machine and stacked simultaneously upon the lift platform. Then, when the lever 26 is pulled downwardly, the linkage mechanism 27 causes the clutch 25 to engage the clutch finger plate 24 to rotate the lift shaft 16 so as to wind the cables 14, 14' about it. Immediately upon the tightening of cables 14, 14', the cradle 11 dips backwardly to the position shown in dotted lines in Fig. 4, so that there is no danger of the boxes falling off of the lift platform as it is pulled upwardly to raise the boxes.

The machine having been set in operation as above described, the worker handling the boxes is now free to go about his business of bringing another stack of boxes up to the machine to be dumped, no supervision of the machine being required. As the boxes are lifted along the cradle 11, the uppermost box in the stack will contact the moving belt 34, and the resilient pressure of this belt against the top of the box will tip the box over on its side onto the inclined platform 35. When the box is thus tipped onto its side, the contents of the box will be dumped down the inclined platform into suitable containers or onto other machinery (not shown) for processing. Resting on its side on the inclined platform 35, the dumped box will be engaged by a finger 36 on the take-off chain 37 and be slid sidewise along the inclined platform 36 so as to be pushed out of the way of the succeeding box of the stack of boxes which continues to be lifted by the continued movement of the lift platform 12. When the lift platform 12 has advanced sufficiently to bring another box into contact with the dumping belts 34, that box will be tilted over on its side onto the inclined platform 35 and the contents dumped therefrom as explained above.

As each empty box is slid sidewise along the inclined platform 35 by movement of the take-off chain 37, it approaches the narrower end of this platform which is so proportioned that the heavy bottom end of the empty box will extend over the top edge of the inclined platform so that when the platform is sufficiently narrow the empty box will finally tilt backwardly so as to right itself and roll off of the inclined platform. When the empty boxes are turned upright by rolling off the narrow portion of the inclined platform 35, they may be received or caught in any customary manner, such as a conveyor belt (not shown) for movement to another location.

The lift platform 12 continues its upward movement until it nears the top of the cradle 11 and all of the boxes thereon have been dumped, then the trip 30 pushes the handle 26 upwardly so as to operate the link mechanism 27 to release the clutch 25 from the clutch finger plate 24. When the clutch is released, the lift platform 12 will return to the bottom of the cradle 11 by gravity; but the brake strap 40, binding intermittently on the shaft 16 will retard the downward motion of the platform 12 so that it will come to rest easily at the bottom of the cradle 11.

Having thus described my invention, it will be obvious to those skilled in the art that I have provided a needed machine of great convenience and usefulness, and while I have illustrated and described my invention in a very practical embodiment thereof without attempting to illustrate or describe other embodiments and adaptations which I contemplate, various changes may be made without departing from the scope of my invention as defined in the following claims.

I claim:

1. In a box dumping machine, a cradle, a lift platform on the front of said cradle, power means for driving said machine, manually operable means for selectively connecting said power means to said lift platform to move it upwardly along said cradle, release means automatically operable when said lift platform reaches a predetermined height to disconnect said power means from said platform, an inclined platform adjacent the top of said cradle, said inclined platform being positioned behind said cradle and inclined downwardly from said cradle, resilient means spaced upwardly from the top of said cradle so as to contact a box carried by said lift platform and movable to tilt said box onto its side on said inclined platform to dump the contents from said box, and conveyor means for moving the empty box sidewise along said inclined platform, said inclined platform being progressively narrower from the top down so that as the empty box is moved sidewise along said inclined platform it will be turned upright by rolling off the upper edge of said inclined platform.

2. In a box dumping machine, a cradle, a lift platform on the front of said cradle, power means for driving said machine, manually operable means for selectively connecting said power means to said lift platform to move it upwardly along said cradle, release means automatically operable when said lift platform reaches a predetermined height to disconnect said power means from said platform, an inclined platform adjacent the top of said cradle, said inclined platform being positioned behind said cradle and inclined downwardly from said cradle, driven means spaced upwardly from the top of said cradle so as to contact a box carried by said lift platform and tilt said box onto its side on said inclined platform to dump the contents from said box, and conveyor means for moving the empty box sidewise along said inclined platform, said inclined platform being progressively narrower from the top down so that as the empty box is moved sidewise along said inclined platform it will be turned upright by rolling off the upper edge of said inclined platform.

3. In a box dumping machine, a cradle, a lift platform on the front of said cradle, power means for driving said machine, manually operable means for selectively connecting said power means to said lift platform to move it upwardly along said cradle, release means automatically operable when said lift platform reaches a predetermined height to disconnect said power means from said platform to permit said platform to move downwardly along said cradle by gravity, an inclined platform adjacent the top of said cradle, said inclined platform being positioned behind said cradle and inclined downwardly from said cradle, movable belt means spaced upwardly from the top of said cradle so as to contact a box carried by said lift platform and tilt said box onto its side on said inclined platform to dump the contents from said box, and conveyor means for moving the empty box sidewise along said inclined platform, said inclined platform being progressively narrower from the top down so that as the empty box is moved sidewise along said inclined platform it will be turned upright by rolling off the upper edge of said inclined platform.

4. In a box dumping machine, a tiltably mounted cradle normally positioned substantially upright, a lift platform on the front of said cradle, power means for driving said machine, manually operable drive means for selectively connecting said power means to said lift platform to move it upwardly along said cradle, said drive means including tension members arranged to tilt said cradle backwardly when said power means is connected to lift said lift platform, release means automatically operable when said lift platform reaches a predetermined height to disconnect said power means from said platform to permit said platform to move downwardly along said cradle by gravity, an inclined platform adjacent the top of said cradle, said inclined platform being positioned behind said cradle and inclined downwardly from said cradle, and traveling means spaced upwardly from the top of said cradle so as to contact a box carried by said lift platform and tilt said box onto its side on said inclined platform so as to dump the contents from said box.

5. In a box dumping machine, a tiltably mounted cradle normally positioned substantially upright, a lift platform on the front of said cradle, power means for driving said machine, manually operable drive means for selectively connecting said power means to said lift platform to move it upwardly along said cradle, said drive means including tension members extending over the upper end of said cradle and arranged to tilt said cradle backwardly when said power means is connected to lift said lift platform, release means automatically operable when said lift platform reaches a predetermined height to disconnect said power means from said platform to permit said platform to move downwardly along said cradle by gravity, an inclined platform adjacent the top of said cradle, said inclined platform being positioned behind said cradle and inclined downwardly from said cradle, and means spaced upwardly from the top of said cradle so as to contact a box carried by said lift platform and movable to tilt said box onto its side on said inclined platform so as to dump the contents from said box.

6. In a box dumping machine, a tiltably mounted cradle normally positioned substantially upright, a lift platform on the front of said cradle, power means for driving said machine, manually operable drive means for selectively connecting said power means to said lift platform to move it upwardly along said cradle, said drive means including tension members extending over the upper end of said cradle and arranged to tilt said cradle backwardly when said power means is connected to lift said lift platform, release means automatically operable when said lift platform reaches a predetermined height to disconnect said power means from said platform to permit said platform to move downwardly along said cradle by gravity, an inclined platform adjacent the top of said cradle, said inclined platform being positioned behind said cradle and inclined downwardly from said cradle, and driven movable means spaced upwardly from the top of said cradle so as to contact a box carried by said lift platform and tilt said box onto its side on said inclined platform to dump the contents from said box.

7. In a box dumping machine, a tiltably mounted cradle normally positioned substantially upright, a lift platform on the front of said cradle, power means for driving said machine, manually operable drive means for selectively connecting said power means to said lift platform to move it upwardly along said cradle, said drive means including tension members extending over the upper end of said cradle and arranged to tilt said cradle backwardly when said power means is connected to lift said lift platform, release means automatically operable when said lift platform reaches a predetermined height to disconnect said power means from said platform to permit said platform to move downwardly along said cradle by gravity, an inclined platform adjacent the top of said cradle, said inclined platform being positioned behind said cradle and inclined downwardly from said cradle, driven means spaced upwardly from the top of said cradle so as to contact a box carried by said lift platform and tilt said box onto its side on said inclined platform to dump the contents from said box, and conveyor means for moving the empty box sidewise along said inclined platform, said inclined platform being progressively narrower from the top down so that as the empty box is moved sidewise along said inclined platform it will be turned upright by rolling off the upper edge of said inclined platform.

8. In a box dumping machine, a tiltably mounted cradle normally positioned substantially upright, a lift platform on the front of said cradle, power means for driving said machine, manually operable drive means for selectively connecting said power means to said lift platform to move it upwardly along said cradle, said drive means including tension members extending over the upper end of said cradle and arranged to tilt said cradle backwardly when said power means is connected to lift said lift platform, release means automatically operable when said lift platform reaches a predetermined height to disconnect said power means from said platform to permit said platform to move downwardly along said cradle by gravity, brake means operable intermittently to retard the downward movement of said lift platform, an inclined platform adjacent the top of said cradle, said inclined platform being positioned behind said cradle and inclined downwardly from said cradle, moving belt means spaced upwardly from the top of said cradle so as to contact a box carried by said lift platform and tilt said box onto its side on said inclined platform to dump the contents from said box, and conveyor means for moving the empty box sidewise along said inclined platform, said inclined platform being progressively narrower from the top down so that as the empty box is moved sidewise along said inclined platform it will be turned upright by rolling off the upper edge of said inclined platform.

9. In a box dumping machine, a tiltably mounted cradle, a lift platform on the front of said cradle, power means for driving said machine, mechanism for selectively connecting said power means to said lift platform to move it rearwardly along said cradle, said mechanism including a tension member connected to said lift platform and engaging said cradle to tilt said cradle backwardly when said power means is connected to apply power through said tension member to move said lift platform upwardly along said cradle, release means automatically operable when said lift platform reaches a predetermined height to disconnect said power means from said platform, and driven means spaced upwardly from the top of said cradle so as to contact a box carried by said lift platform and movable to tilt said box onto its side so as to dump the contents from said box.

10. In a box dumping machine, a tiltably mounted cradle, a lift platform on the front of said cradle, power means for driving said machine, manually operable mechanism for selectively connecting said power means to said lift platform to move it upwardly along said cradle, said mechanism including a tension member connected to said lift platform and engaging said cradle near the top thereof to tilt said cradle backwardly when said power means is connected to apply power through said tension member to move said lift platform upwardly along said cradle, release means automatically operable when said lift platform reaches a predetermined height to disconnect said power means from said platform, an inclined platform adjacent the top of said cradle, said inclined platform being positioned behind said cradle and inclined downwardly from said cradle, and resilient means spaced upwardly from the top of said cradle so as to contact a box carried by said platform and movable to tilt said box onto its side on said platform to dump the contents from said box.

11. In a box dumping machine, a tiltably mounted cradle normally positioned substantially upright, a lift platform on the front of said cradle, power means for driving said machine, manually operable drive means for selectively connecting said power means to said lift platform to move it upwardly along said cradle, said drive means including a member connected to said platform and arranged to apply pressure to said cradle to tilt said cradle backward automatically when said power means is connected to lift said lift platform, release means automatically operable when said lift platform reaches a predetermined height to permit said platform to move downwardly along said cradle by gravity, and traveling means spaced upwardly from the top of said cradle so as to contact a box carried by said lift platform and tilt said box onto its side so as to dump the contents from said box.

SAM McEVER.

References Cited in the file of this patent
UNITED STATES PATENTS

| Number | Name | Date |
| --- | --- | --- |
| 766,515 | Northrup | Aug. 2, 1904 |
| 1,504,034 | Erwin | Aug. 5, 1924 |
| 1,907,458 | Stevenson | May 9, 1933 |
| 2,339,020 | Le Tourneau | Jan. 11, 1944 |